(No Model.)

A. WESTWOOD.
MEANS FOR SUPPORTING ENDS OF GIRDERS, &c.

No. 592,852. Patented Nov. 2, 1897.

Witnesses
H. van Oldenneel
E. A. Scott

Inventor
Alfred Westwood
by Richardson
Attorneys

UNITED STATES PATENT OFFICE.

ALFRED WESTWOOD, OF TIPTON, ENGLAND.

MEANS FOR SUPPORTING ENDS OF GIRDERS, &c.

SPECIFICATION forming part of Letters Patent No. 592,852, dated November 2, 1897.

Application filed July 10, 1896. Serial No. 598,713. (No model.) Patented in England December 4, 1895, No. 23,212.

*To all whom it may concern:*

Be it known that I, ALFRED WESTWOOD, works foreman, a subject of the Queen of Great Britain, residing at 8 Horseley Heath, Tipton, county of Stafford, England, have invented certain new and useful Improvements in Means for Supporting the Ends of Girders and other Beams, of which the following is a specification.

The invention has been patented in England, No. 23,212, dated December 4, 1895.

My invention has for its object improvements in the mode and means for supporting the ends of girders and other beams so that the expansion and contraction in the girders, beams, trusses, or such like members may be allowed to take place with great freedom and steadiness and at the same time allowing the girder or other member to deflect or bend in a natural manner under varying and moving loads. I do away entirely with the old rollers and the pivot above the rollers, as my invention combines the qualities of both in one.

Upon the abutments, walls, or other supports of bridges, roofs, and other structures required to be bridged over I mount my bearing-plates and intermediate elliptical bearing-block. I also mount a similar bearing-plate underneath one or both ends of the girder, truss, or other beam or bridge. The lower bearing-plate is hollowed or curved on its upper face to suit the elliptical bearing-block, and the upper bearing-block is likewise hollowed upon its under face, also to suit the elliptical bearing-block. The bearing-block is provided with end flanges to prevent the block from moving out of its proper position. These bearing plates and blocks may be made from such metal as steel, cast-iron, or other suitable metal or material.

In order that my invention may be clearly understood and more easily carried into practical effect, I have appended hereunto drawings illustrating an example of the same; but it must be clearly understood that the principle may be applied to structural purposes generally which are subject to variations from expansion and contraction or to deflection and vibratory action.

Figure 1:
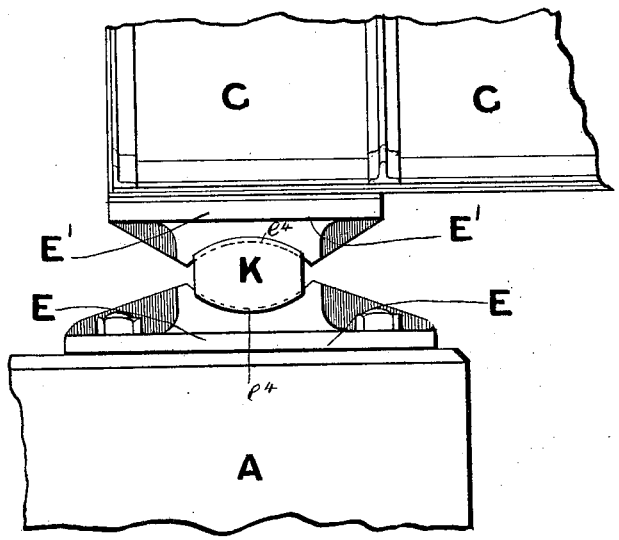
Figure 2:
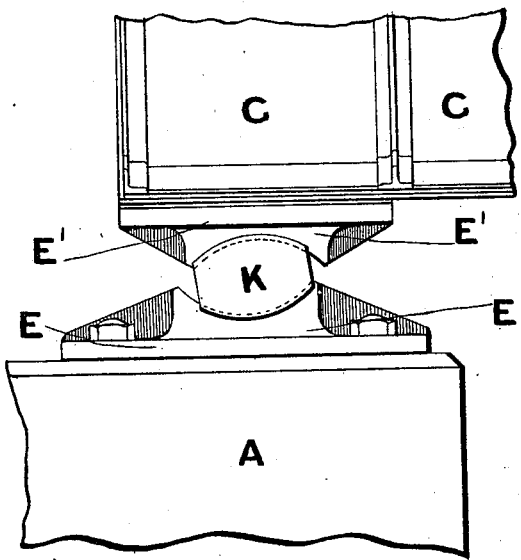
Figure 3:
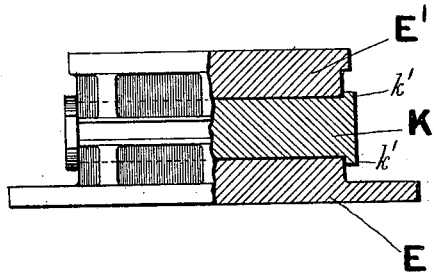

Figure 1 is a broken-off side elevation of a girder or beam G with its left end mounted upon an abutment A, with my bearing-plates E and E' and my elliptical bearing-block K between, as they would show in a medium temperature. Fig. 2 is a similar elevation to Fig. 1, with the same parts shown, but the girder G is here supposed to have contracted in length, thus moving the relative position of E' to K and K to E. Fig. 3 is a part end or side elevation and part section of the bearing-plates E and E' and of the elliptical bearing-block K, as seen at Fig. 1.

The girder G represents one end of any beam or truss liable to expansion, contraction, deflection, or vibration, and A represents any bridge-roof or other abutment.

My invention consists of a bottom bearing-plate E, hollowed out at $e^4$ to any suitable concentric curve and resting upon any suitable support A, to which it may be fastened by bolts or otherwise. The upper bearing-plate E' is similar to E, but generally somewhat smaller and lighter, and it is likewise hollowed at $e^4$ to a concentric curve. The intermediate elliptical bearing-block K, with its flanges $k'$, has its upper and lower faces curved to concentric curves, so as to fit the upper and lower plates, and these faces are turned in a lathe or otherwise machined and made true to fit the bearing-plates, so as to establish and maintain a large area of bearing-surface.

It will of course be observed that the elliptical bearing-block is only the required thickness to establish a sufficient distance between E and E' to allow the necessary movements.

At Fig. 2 the girder G and bearing-block E' are shown moved to the right by contraction, which has caused the intermediate elliptical block K to slide upon the upper and lower bearing-plates, but the bearing-surface area remains substantially the same as at Fig. 1, and this would be similar if the girder G were expanded and moved to the left. This, what I term the "combined circular and sliding action" of my block upon the bearing-plates, is due to its special shape of curved faces, but yet it is much too thin to separate the plates sufficiently to form a complete circle. I therefore call it "elliptical." This combined action keeps the surface from rusting or corroding, which is a most valuable quality in such constructions. Now while expansion and contraction are thus perfectly provided for by my invention the girder in either deflecting or vibrating is equally provided for by the elliptical block K and its bearing-plates, so that freedom of action with perfect security and steadiness is obtained.

What I claim, then, is—

1. A support for girders and the like to provide for expansion and contraction comprising upper and lower bearing parts having curved bearing-surfaces, and an oval block between said bearing-surfaces, its shorter diameter approximately vertical, and its longer diameter approximately horizontal, whereby the said block has a circular movement and a sliding movement.

2. A support for girders and the like to provide for expansion and contraction comprising an upper and a lower bearing part having curved bearing-surfaces, and an oval block between said bearing-surfaces, its shorter diameter approximately vertical, and its longer diameter approximately horizontal, whereby the said block has a circular movement and a sliding movement, said bearing parts having extended surfaces.

In testimony that I claim the foregoing as my own I affix my name in the presence of two witnesses.

ALFRED WESTWOOD.

Witnesses:
GEORGE BARKER,
GEORGE LESTER.